United States Patent [19]
Eichhorn

[11] Patent Number: 5,517,718
[45] Date of Patent: May 21, 1996

[54] CASTER ASSEMBLY WITH AUTOMATIC SWIVEL LOCK/UNLOCK

[75] Inventor: Anthony E. Eichhorn, East Amherst, N.Y.

[73] Assignee: Fisher-Price, Inc., East Aurora, N.Y.

[21] Appl. No.: 266,858

[22] Filed: Jul. 5, 1994

[51] Int. Cl.$^6$ ........................................ B60B 33/02
[52] U.S. Cl. .............................. 16/35 R; 16/18 R; 16/45; 188/1.12; 280/79.11
[58] Field of Search .................. 16/18 R, 20, 21, 16/35 R, 44, 45, 47; 188/1.12, 29, 74; 296/20; 280/47.11, 79.11, 78

[56] References Cited

U.S. PATENT DOCUMENTS

| | | | |
|---|---|---|---|
| 4,028,773 | 6/1977 | Morgan | 16/35 R |
| 4,759,098 | 7/1988 | Ko | 16/35 R |
| 4,831,689 | 5/1989 | Lo | 16/35 R |
| 5,139,116 | 8/1992 | Screen | 16/35 R |
| 5,191,674 | 3/1993 | Zun | 16/35 R |
| 5,215,320 | 6/1993 | Chen | 16/35 R |

*Primary Examiner*—W. Donald Bray
*Attorney, Agent, or Firm*—Howrey & Simon; Melvin L. Barnes, Jr.; C. Scott Talbot

[57] ABSTRACT

A caster assembly for a traveling body has an automatic swivel lock that prevents the caster from swiveling when the caster is a trailing caster on the traveling body and allows the caster to swivel when the caster is a leading caster on the traveling body. The caster assembly includes a lock assembly pivotally mounted to support arms that extend from the swiveling wheel mount. A fixed locking member extends from the traveling body's frame to engage a locking lever extending from the lock assembly when the caster wheel is a trailing wheel on the traveling body. A cam follower engages a cam surface on the inside of the wheel to pivotally disengage the lock assembly from the locking member when the traveling body reverses direction so that the caster, which has become a leading caster, is free to swivel. Upon reversing direction again, the locking lever engages a camming surface on the locking member to pivot the locking lever inward so that the locking lever slips into a recess on the locking lever to prevent the caster wheel from swiveling. Thus, the caster mechanism automatically switches between locked and freely swiveling modes solely in response to a reversal in the direction of the traveling body.

12 Claims, 9 Drawing Sheets

CASTER ASSEMBLY WITH AUTOMATIC SWIVEL LOCK/UNLOCK

BACKGROUND OF THE INVENTION

The invention relates to a caster assembly for a traveling body, and specifically to a caster assembly having an automatic swivel lock/unlock feature that prevents the caster from swiveling when the caster is a trailing caster on the traveling body and allows the caster to swivel when the caster is a leading caster on the traveling body. The caster mechanism automatically switches between locked and freely swiveling modes solely in response to a reversal in the direction of the traveling body. Thus, the leading casters are always freely swiveling and the trailing casters are always restrained from swiveling.

Conventionally, a traveling body, such as a child's stroller, is fitted with wheels at each of the four corners of the body. If the orientations of all four wheels are fixed with respect to the stroller it cannot easily be turned or moved along a curved path. Generally, each wheel's axis of rotation should intersect the center of motion of the traveling body when the body moves along a curved path.

A wheel arrangement known for pivoting a wheel, particularly wheels used on traveling bodies such as strollers, is a caster wheel. A caster wheel can be defined as a wheel in which the wheel's axle (which defines its axis of rotation) is mounted to a wheel mount, which is pivotable about a vertical pivot axis, with the wheel's axle offset horizontally from the wheel mount's pivot axis. This geometry provides a stable arrangement in which the wheel's axle will tend to trail the pivot axis when a horizontal motive force is applied to the mount, the axle tending to align perpendicularly to the direction of motion (and thus to intersect the center of motion).

A conventional arrangement is therefore to couple the leading wheels (with respect to the direction of motion of the stroller) to the stroller so that their axis of rotation can be changed relative to the stroller (i.e., the leading wheels can pivot about a vertical axis). When the front wheels are pivotable and the trailing wheels are fixed, the stroller can be readily steered by an operator along a fixed path.

The arrangement of two permanently pivotable wheels (casters) and two permanently fixed wheels is unsuitable if the stroller is to be movable in both forward and reverse directions, i.e., a particular wheel may be leading when the stroller is moved in a forward direction and trailing when the stroller is moved in a reverse direction. The steering characteristics of the stroller are unfavorable if the leading wheels are fixed and the rear wheels are pivotable. In this configuration the stroller is susceptible to "boat" steering, in which the rear of the stroller must be moved a large amount for a relatively small change in the direction of motion. The handling characteristics are also poor if all wheels are pivotable—the stroller will tend to roll down hill. So if the travel surface is not level (perpendicular to the direction of motion) the stroller will veer off its intended course. It is therefore desirable to provide each wheel with a mechanism to allow a wheel to pivot when the wheel is leading, and to fix the wheel when it is trailing.

Several such mechanisms have been proposed that require manual actuation by the user. U.S. Pat. No. 3,636,586 to Bollinger et al. and U.S. Pat. No. 3,751,758 to Higbee et al. disclose manually operated caster locks that inhibit swiveling of the wheel by the downward rotation of a locking member to a position along the sides of the wheel. Once the lock is manually engaged and the wheel swivels to the predetermined position, the locking members rotate down to engage the sides of the wheel to prevent swivel.

The caster lock disclosed in U.S. Pat. No. 4,779,879 to Kassai, uses a manually controlled operator knob that is connected to the front and rear casters by a wire. The operator can select the front or rear wheels to be locked in a nonswiveling configuration.

Another manually operated caster lock is disclosed in U.S. Pat. No. 4,684,148 to Glaser. This design uses a locking member that is attached to the frame and pivots down to engage a recess in the caster to prevent swiveling of the wheel.

None of the patents described above disclose an "automatic" swivel locking mechanism—they all require the operator to take some action to engage the swivel lock.

U.S. Pat. No. 2,583,858 to Kostolecki discloses an automatic swivel locking caster in which a locking mechanism holds the caster wheel in a predetermined position with a spring-loaded ball and mating recess. This mechanism will prevent swiveling of the wheel when the ball and recess come into alignment and will allow swivel when the rotational force on the swivel mechanism (about its vertical axis of rotation) becomes great enough to overcome the force of the compression spring and dislodge the ball from the recess.

This design suffers from the drawback that it requires a lateral force to dislodge the ball from the recess to permit swiveling of the wheel. If the direction of travel of the traveling body is simply reversed (such as by stopping the body, and then moving it in an opposite direction) the necessary rotational force would not be present and the wheels would incorrectly remain in the swivel locked configuration. Furthermore, in some applications, such as light weight strollers or suitcases, it would be undesirable to require the application of a significant lateral force.

Another automatic caster wheel assembly is disclosed in U.S. Pat. No. 4,494,272 to Morita. This design uses an inner wheel supporting frame pivotally mounted in a second swiveling frame. This second frame is rotatably mounted on the mounting base. When the direction of the vehicle changes from a forward to a reverse direction, a pawl engages the wheel, preventing rotation of the wheel and the frictional force of the ground on the wheel pivots the inner frame to disengage the swivel lock. When the vehicle changes back to its original direction, the wheel swivels towards its locking position and the camming surface of the swivel lock mechanism depresses a spring urged engaging pin until the grooved section of the locking mechanism comes into original alignment with the engaging pin once again preventing swivel. This mechanism is somewhat complex mechanically.

SUMMARY OF THE INVENTION

The drawbacks of the prior art are overcome by the present invention, which provides a caster assembly for a traveling body that has an automatic swivel lock that prevents the caster from swiveling when the caster is a trailing caster on the traveling body and allows the caster to swivel when the caster is a leading caster on the traveling body. The caster mechanism automatically switches between locked and freely swiveling modes solely in response to a reversal in the direction of the traveling body. The caster assembly is simple in design for enhanced reliability and for greater ease in manufacturing, repair, and replacement of parts.

The invention includes a swivel locking member coupled to the frame leg of the stroller in a fixed position. A wheel rotatably mounted on a swiveling wheel mount includes a cam surface and a cam gap. A lock assembly pivotally coupled to the swiveling wheel mount is positioned above the cam surface of the wheel and has a cam follower for engaging the cam surface of the wheel and a locking lever for engaging the swivel locking member to prevent swivel.

DETAILED DESCRIPTION

The invention is described and illustrated below in the context of a child's stroller, although the caster wheel assembly may be used on any similar wheeled traveling body (such as a medical gurney, coal cart, shopping cart, large suitcase, or dolly).

Figure 1:
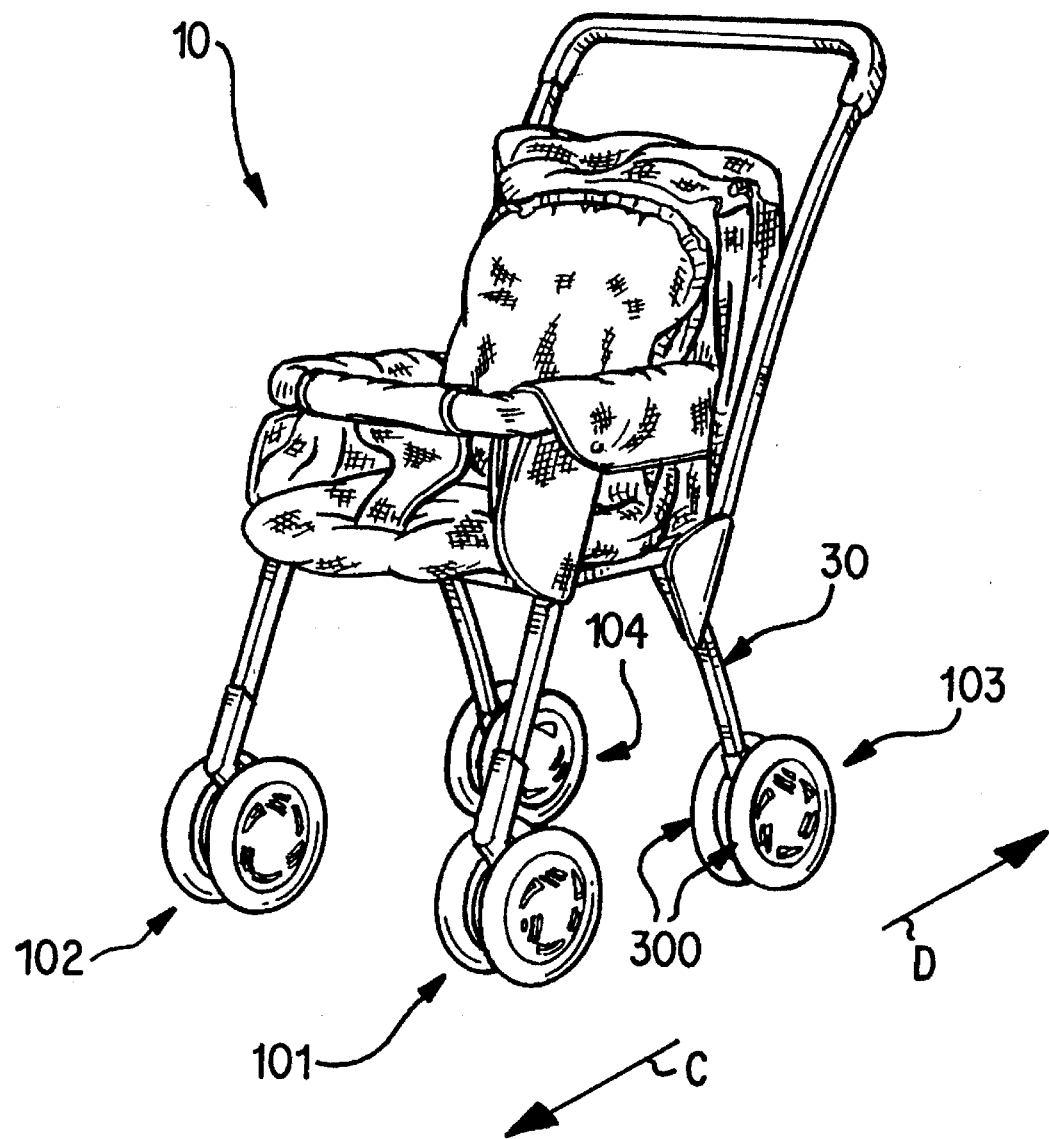
FIG. 1 is a schematic illustration of a stroller with caster assemblies.

A stroller 10 is illustrated in FIG. 1. The stroller 10 has a frame 30 that serves as a support for four caster wheel assemblies 101–104. Each caster assembly includes two wheels 300. As described above, it is desirable that when the caster assemblies 101, 102 are the leading assemblies with respect to the direction of travel of the stroller 10 (i.e., when the stroller is moved in the direction indicated by arrow C), they are allowed to pivot freely, and that the trailing caster assemblies 103, 104 are fixed. However, when the stroller's direction of travel is reversed (i.e., when it is moving in the direction of arrow D), so that assemblies 103, 104 are leading with respect to the direction of movement, they are in a free swivel state, and trailing caster assemblies 101, 102 are prevented from swiveling.

Figure 2:
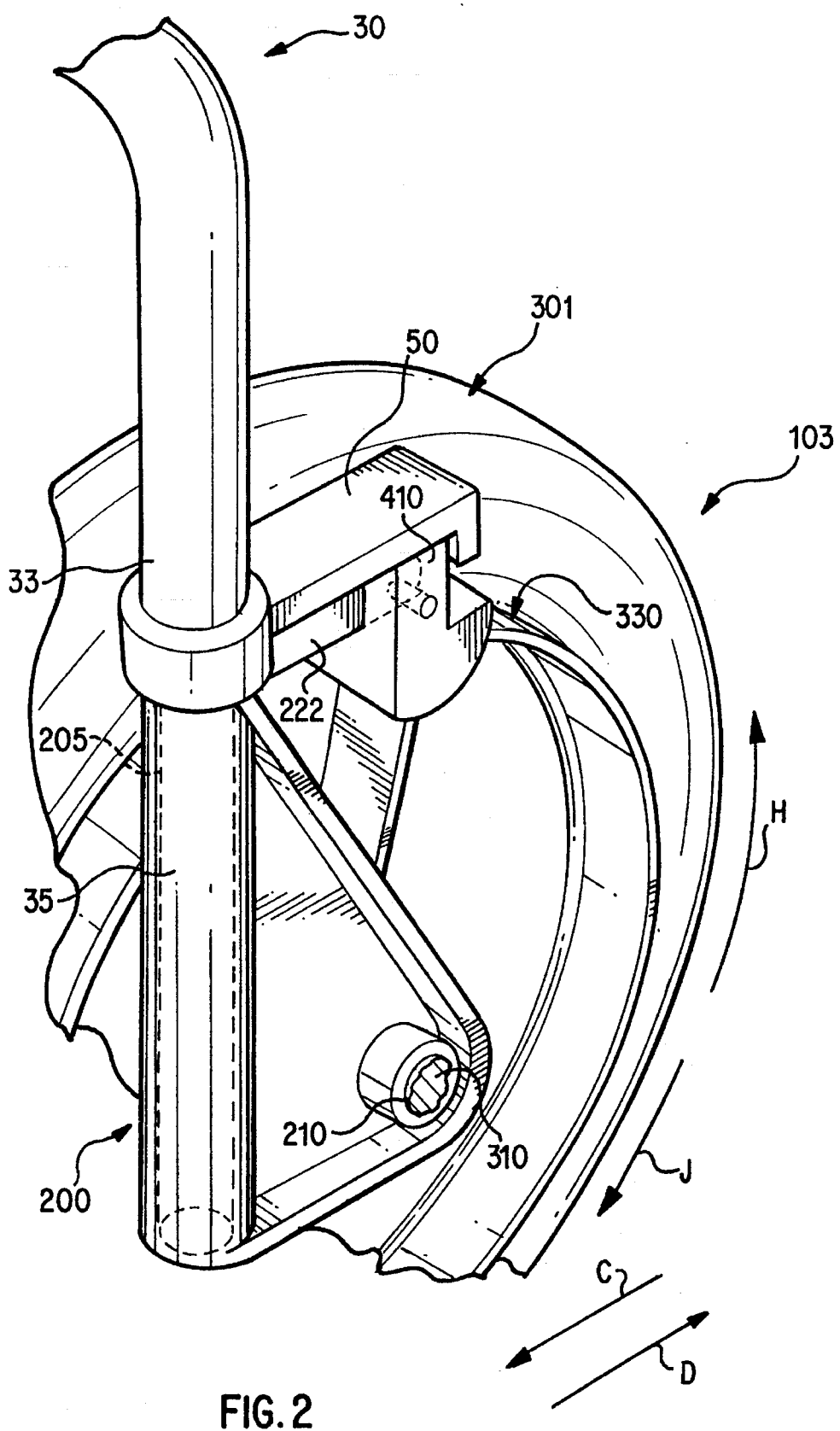
FIG. 2 is a perspective view of one of the caster wheel assemblies of FIG. 1 with one wheel removed.
Figure 3:
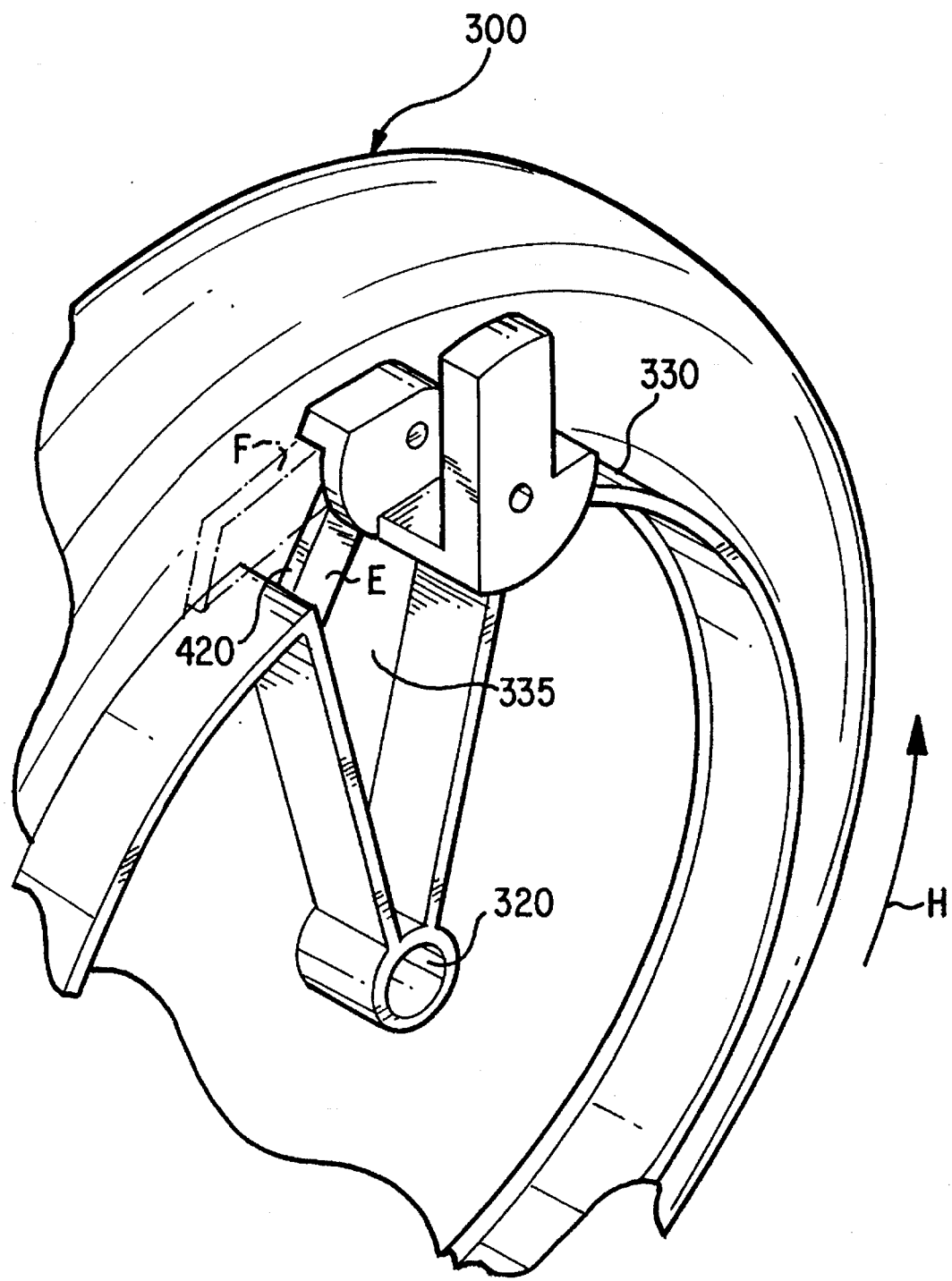
FIG. 3 is a partial perspective view of the wheel, and swivel lock assembly of FIG. 2.

Caster assembly 103 is shown in more detail in FIGS. 2–4 with one of the two wheels not shown to more easily view the locking mechanism. The caster assembly includes a swiveling wheel mount 200 that is attached to the frame 30 of the stroller 10 by a mounting pin 35 that extends from the bottom of the frame leg 33, through the locking member 50, and also through the swivel bore 205 of the wheel mount 200 so that the wheel mount 200 rotates about the substantially vertical mount axis of pin 35. Thus, the caster assembly "swivels" about pin 35. A swivel locking member 50 is fixed in position with respect to the frame 30.

Each wheel 300 is rotatably coupled to the wheel mount 200 by a wheel axle 310 that extends through the wheel axle bore 320 and the axle support bore 210 so that the wheel 300 rotates about the horizontal wheel axis of the wheel axle 310. The wheel axle 310 is offset horizontally from the vertical mount axis to define a conventional caster wheel geometry. A camming surface 330 is disposed on the wheel mount side of wheel 300 and generally concentric about the wheel axis. A second wheel, which is not shown, need not have a camming surface. The camming surface 330 of this embodiment is substantially continuous around the perimeter of the wheel except for a relatively small gap 335.

Figure 4A:
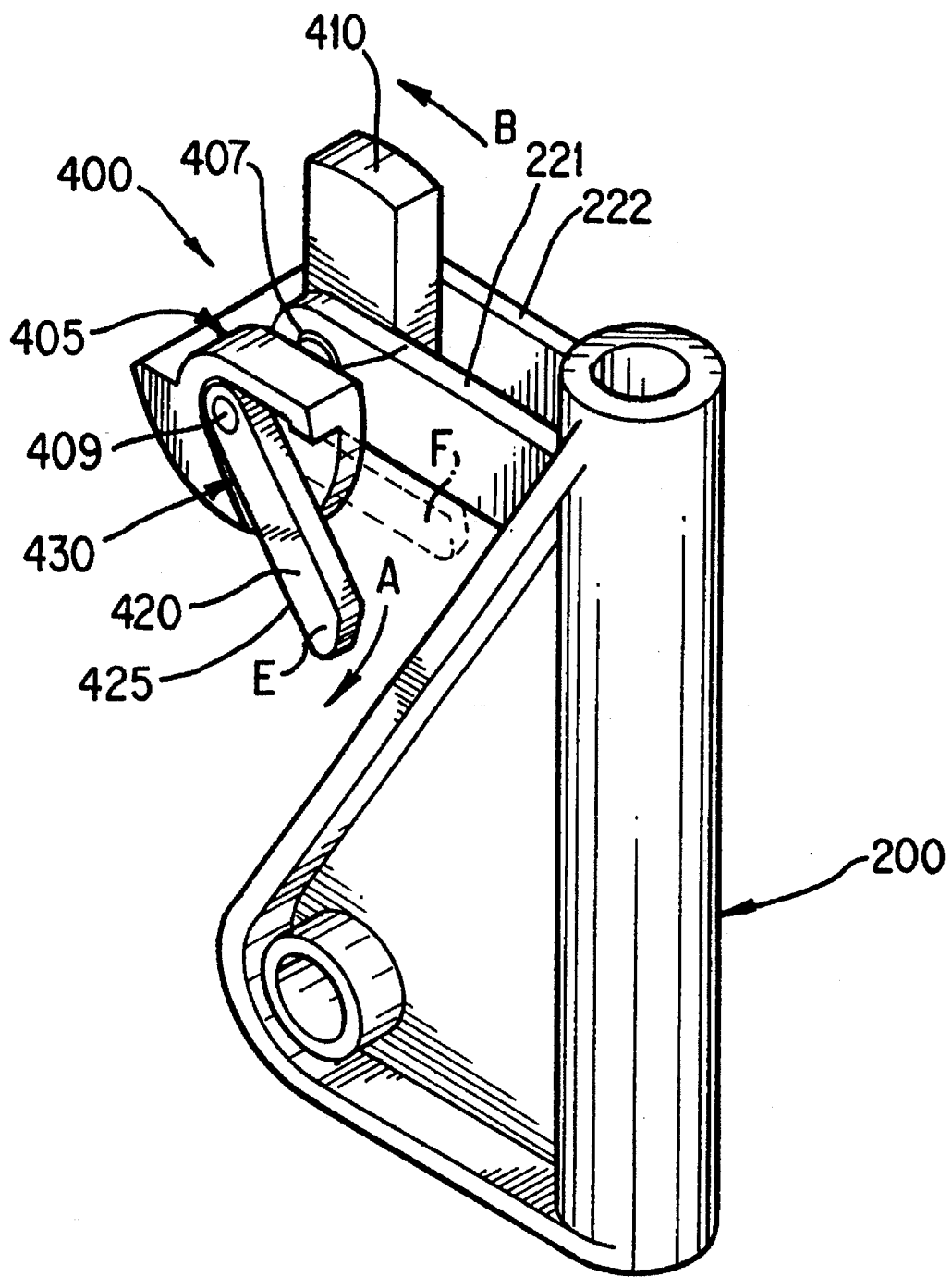
FIG. 4A is a partial perspective view of the swivel lock assembly mounted on the swiveling wheel mount of FIG. 2.
Figure 4B:
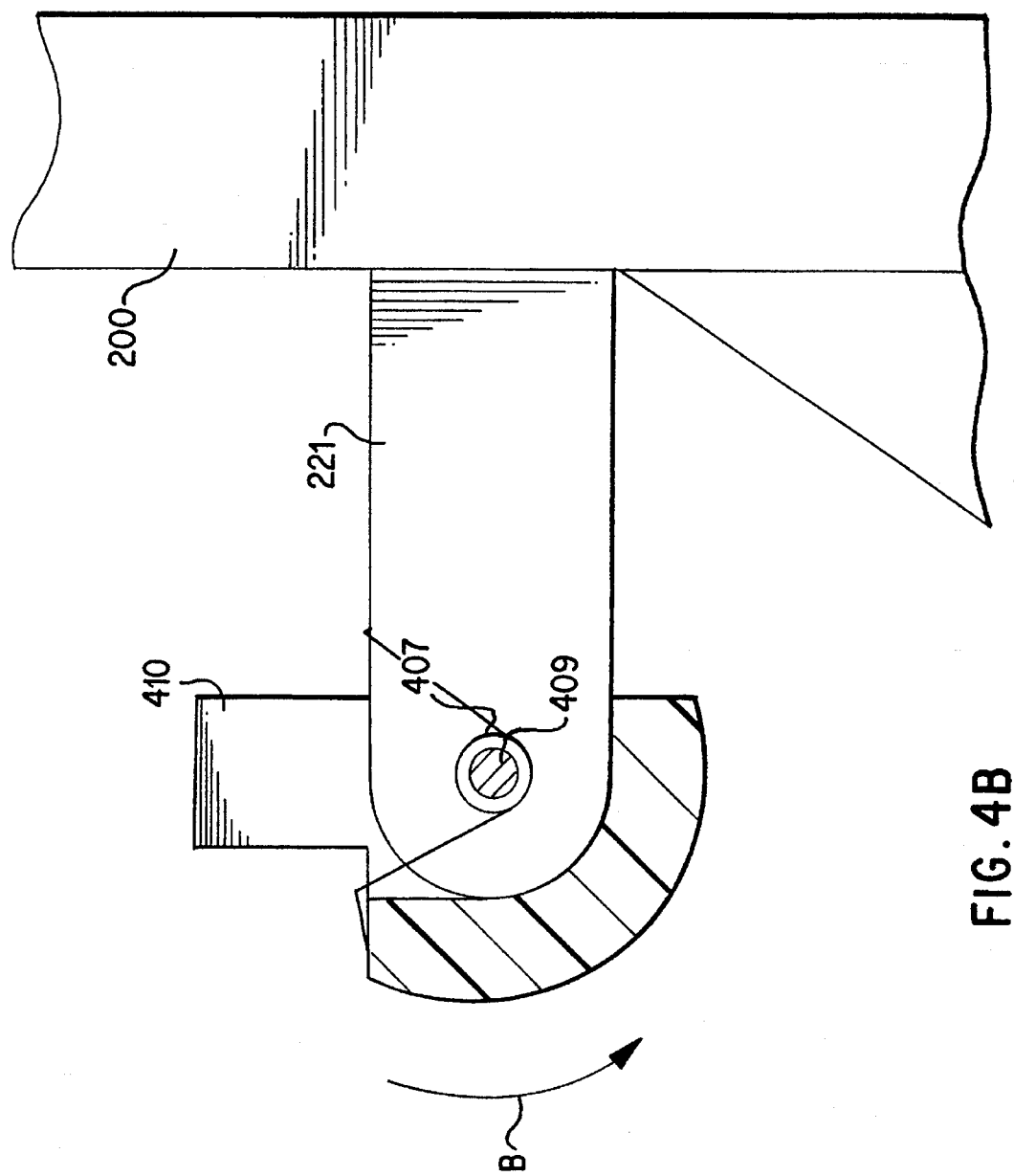
FIG. 4B is a partial cross-sectional side view of the swivel lock assembly of FIG. 4A.
Figure 7:
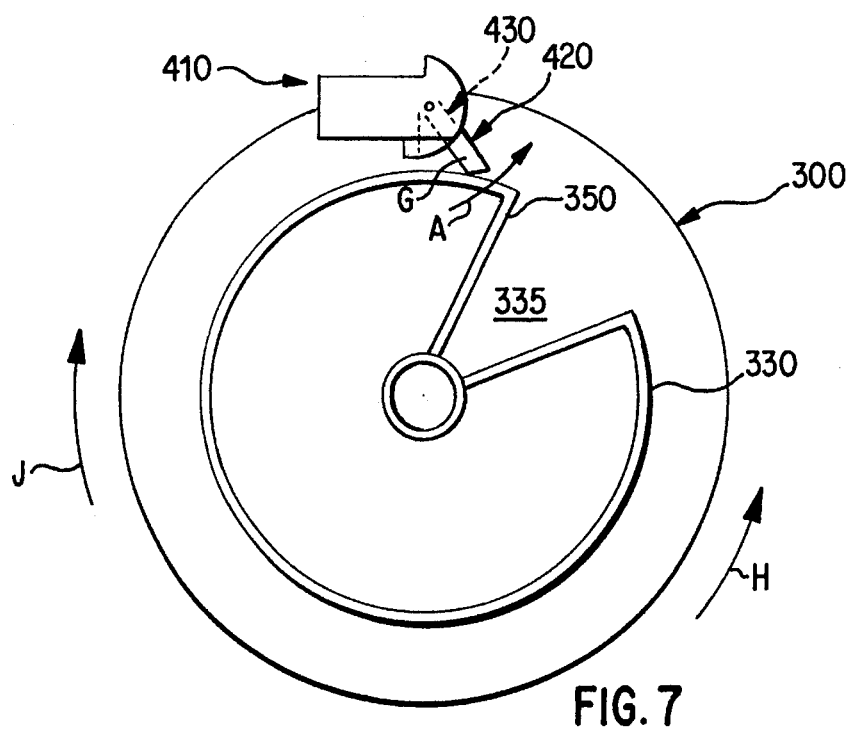
FIG. 7 is a partial side view of the wheel and the lock assembly of FIG. 2 with the lock assembly in the pivoted non-lockable position.

As best seen in FIG. 4A, extending from swivel wheel mount 200 are a pair of support arms 221, 222. Swivel lock assembly 400 is mounted on pin 409 to permit pivotal movement with respect to the support arms 221, 222. Swivel lock assembly 400 consists of a lock assembly body 405, a swivel locking lever 410, and a cam follower 420. Locking lever 410 extends from the body 405 of the lock assembly 400, between support arms 221, 222. Swivel lock assembly 400 is pivotable between a lockable position in which the locking lever 4 10 is substantially vertical (as shown in FIG. 4A) and can engage swivel locking member 50, and a non-lockable position in which the locking lever 410 is inclined (as shown in FIG. 7) and cannot engage swivel locking member 50. Lock assembly 400 is urged in the direction of arrow B to the lockable position by spring 407 that is mounted on pin 409, as best seen in FIG. 4B.

Cam follower 420 is pivotally attached to lock assembly body 405, and is urged in the direction of arrow A by gravity. The cam follower 420 is movable through a range of motion with respect to the body 405 including an engagement position (shown in solid lines in FIGS. 3, 4A, and 6A–D and identified in the figures by reference character E) in which the lower side 425 of the cam follower 420 is engaging a lip 430 on the lock assembly, and a first displaced position (shown in phantom in the same figures and identified by reference character F) in which the cam follower 420 is urged upwardly against the force of the gravity.

The cam follower is also movable to a second displaced position with respect to the wheel mount 200 as shown by G in FIG. 7. When cam follower 420 is in the engagement position, its lower side 425 engages a lip 430 on the lock assembly body 405. If cam follower 420 is rotated further in the direction of arrow A, it causes the entire lock assembly 400 to pivot (from a force applied to it by the flat sloping surface 350 of cam surface gap 335) so that locking lever 410 pivots to the non-lockable position.

Figure 5A:
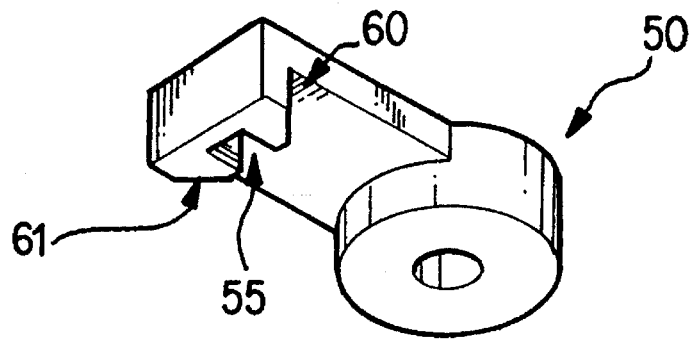
FIGS. 5A–C are perspective, side elevation, and bottom plan views of the swivel locking member.
Figure 5B:
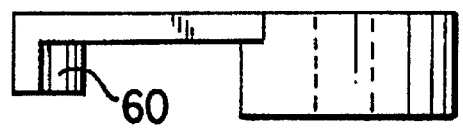
Figure 5C:
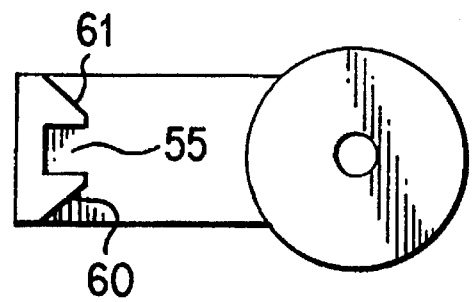

As shown in FIG. 2, caster assembly 103 also includes a swivel locking member 50 that is non-rotatably mounted (with respect to frame 30) between frame leg 33 and swivel wheel mount 200. Locking member 50 extends away from the frame 30 a distance substantially equal to the length of the support arms 221, 222 so that it can engage locking lever 410. As shown in FIGS. 5A–C, at the end of the extended portion of locking member 50 are formed two lever camming surfaces 60, 61 and a lever locking recess 55.

Since caster assembly 103 can only be in a swivel restraining state when locking lever 410 is aligned with locking member 50, locking member 50 must be properly oriented with respect to the frame of the stroller. For a conventional four-wheeled conveyance, the extended portion of locking member 50 should extend away from the center of the conveyance and parallel to the conveyance's forward and reverse directions. This will ensure an orientation in which the trailing casters will be in a swivel restraining state.

To describe the operation of the caster wheel assembly accurately, it is first helpful to establish frames of references for the various moving parts. First referring to FIG. 1, stroller 10 is movable in a forward direction as shown by arrow C and an opposite, reverse direction as shown by arrow D. Swiveling wheel mount 200 is rotatable 360° about the substantially vertical mount axis of the frame mounting pin 35 of FIG. 2. Wheel 300 is mounted on a wheel axle 310 for rotation about a horizontal axis, and this axis (the axle) is spaced horizontally from the mount axis a fixed distance.

When stroller 10 is traveling in the forward direction a freely swiveling caster assembly (such as assembly 103) will be urged to a stable mount position where the horizontal wheel axle 310 trails the vertical mount axis of the swiveling wheel mount 200 with respect to the direction of movement of stroller 10. In this stable mount position, wheel 300 will be rotating in a first direction shown by arrow H relative to swivel wheel mount 200.

However, if the stroller's direction of motion is reversed (to the direction as shown by D) freely swiveling caster assembly 103 will be in an unstable mount position because horizontal wheel axle 310 will be leading the vertical mount axis of swiveling wheel mount 200 with respect to the direction of movement of stroller 10. In this state, wheel 300 will be rotating in a second opposite direction relative to swiveling wheel mount 200 as shown by arrow J. As described above, in this conventional caster wheel geometry a freely swiveling wheel in this unstable mount position will tend to move to the stable mount position due to the frictional forces of the ground on the wheel.

OPERATION

Caster wheel assembly 103 shown in FIG. 2 is a trailing caster positioned in the swivel locked configuration when stroller 10 is moving in the direction of arrow C. In this orientation, wheel 300 is rotating in the direction of arrow H. Wheel mount 200 is in the stable position, since wheel axle 310 is trailing the vertical axis of the wheel mount 200 with respect to the direction of movement of stroller 10. Caster assembly 103 is prevented from swiveling since locking lever 410 of the swivel lock assembly 400 is engaged with lever locking recess 55. Since swivel locking member 50 is fixed relative to the frame, it prevents lateral movement of the swivel lock assembly 400, which in turn prevents swivel wheel mount 200 from swiveling.

Figure 6A:
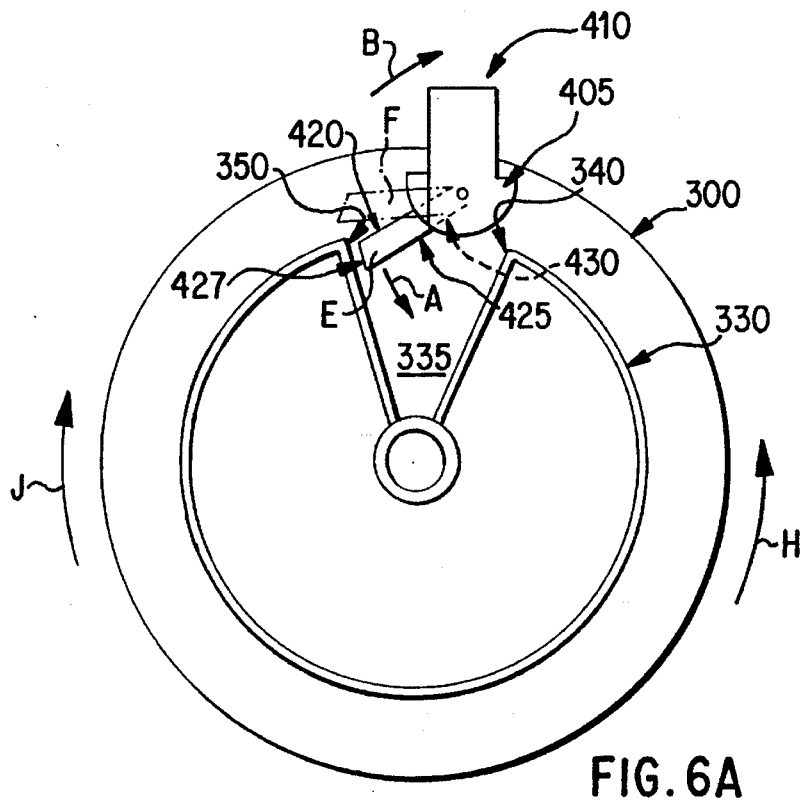
FIG. 6A–D are partial side views of the wheel and the locking assembly of FIG. 2 with the lock assembly in the lockable position of four different embodiments.

Referring to FIG. 3, as the wheel 300 rotates in the direction of arrow H, cam follower 420 is urged to the displaced position (shown in phantom by F) and rides along wheel camming surface 330 until the wheel 300 rotates so that cam surface gap 335 is adjacent lock assembly 400 (as shown in FIG. 6A). Cam follower 420, urged by gravity, pivots down from the displaced position (shown in phantom by F) to an engagement position (shown by E) and into the gap 335 until edge 340 of camming surface 330 encounters the lower side 425 of the cam follower 420. Camming surface 330 urges cam follower 420 upward to its displaced position, so that it will again ride on camming surface 330 as wheel 300 rotates.

Referring to FIG. 2, if the direction of motion of stroller 10 is reversed so that it travels in the direction of arrow D, wheel 300 will rotate in the direction of arrow J. Since wheel axle 310 is leading the vertical axis of wheel mount 200, wheel mount 200 is in an unstable position.

As shown in FIG. 6A, wheel 300 will rotate until camming surface gap 335 is adjacent lock assembly 400, at which time the cam follower 420 will pivot down into gap 335 (due to gravity) until the lower side 425 of cam follower 420 engages lip 430 of body 405. As wheel 300 continues to rotate in the direction of arrow J, flat sloping surface 350 of gap 335 will strike the end 427 of cam follower 420. As illustrated in FIG. 7, as wheel 300 rotates farther, cam follower 420 pivots swivel lock assembly 400, overcoming the force of spring 407, so that locking lever 410 is now in the non-lockable position. As wheel 300 continues to rotate, surface 330 continues to engage cam follower 420 and thus to hold locking lever 410 in the non-lockable position. Once locking lever 410 is disengaged from lever locking recess 55, wheel mount 200 is free to swivel. The frictional forces of the ground on wheel 300 will urge caster wheel assembly 103 toward a stable position in which wheel axle 310 trails the vertical wheel mount axis. Consequently, wheel mount 200 will swivel 180° to a stable position and wheel 300 will reverse its direction of rotation to accommodate its new orientation with respect to the direction of motion of stroller 10. Wheel 300 will then be rotating in the direction of arrow H in FIG. 7. Cam follower 420 will continue to hold swivel lock assembly 400 in the nonlockable position while riding on camming surface 330 of wheel 300 until cam follower 420 reaches cam surface gap 335. Lock assembly 400, urged by spring 407, will then resume its original position with locking lever 410 extending upwards in a lockable position and cam follower 420 riding on camming surface 330 of wheel 300, cyclicly pivoting down to its engagement position into the cam surface gap 335. However, since caster wheel assembly 103 is positioned 180° away from swivel locking member 50, and thus in a non-locking orientation, locking lever 410 cannot engage swivel locking member 50 to prevent swiveling.

Figure 8:
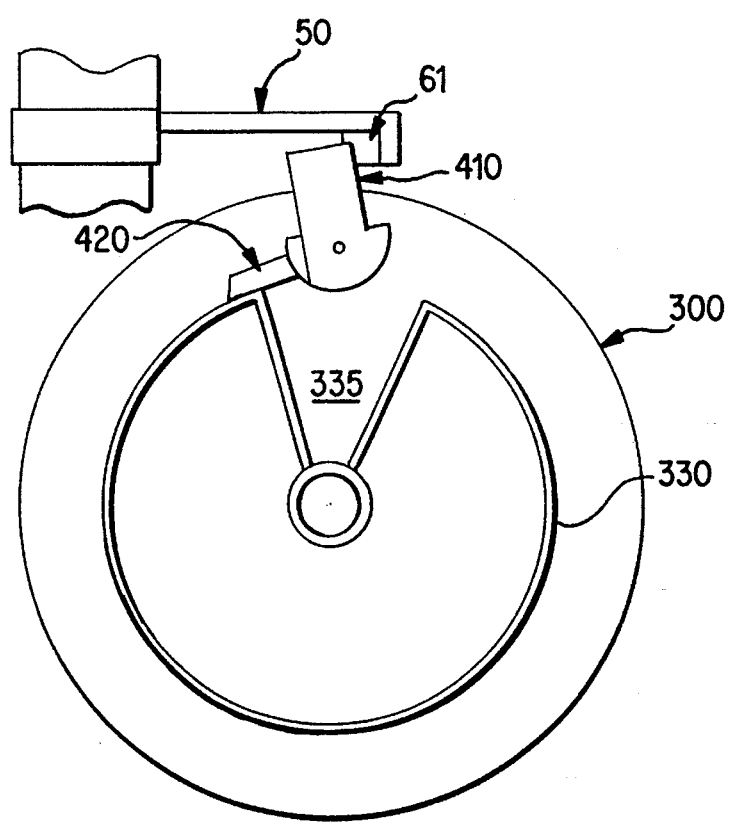
FIG. 8 is a partial side view of the wheel and the lock assembly of FIG. 2 being cammed by the locking member.

In this configuration, caster wheel assembly 103 is in a free swivel state. If the direction of motion of stroller 10 is again reversed, caster wheel assembly 103 would shift to a stable position by swiveling 180° so that the wheel axle 310 trails the vertical swivel mount axis. As swiveling wheel mount 200 rotates back to its original lockable orientation (as shown in FIG. 2), locking member 4 10 of swivel lock assembly 400 comes into contact with lever camming surface 60 or 61 of swivel locking member 50 (depending on which direction the caster wheel assembly 103 happens to swivel). Camming surface 60 or 61 will cam the locking lever 410 toward the vertical swivel mount axis against the bias of spring 407 (as shown in FIG. 8). Locking lever 410 will pivot lock assembly 400 as it engages lever camming surface 60 or 61, until it slips into lever locking recess 55. After engaging recess 55, wheel mount 200 is in the restrained swiveling state with swivel locking member 50 engaging locking lever 410 of swivel lock assembly 400.

Although the illustrated embodiment is used in a four-wheeled stroller, this invention could be used on any multi-wheeled vehicle, such as a three-wheeled stroller, two-wheeled bicycle, or six-wheeled dolly. Furthermore, although the disclosed embodiment includes a caster assembly with two wheels, this invention could also be used with a single wheeled caster assembly. Also, cam follower 420 could be urged by a spring rather than by gravity to the engagement position. Similarly, locking assembly 400 could be designed and mounted to rely on gravity instead of spring 407 to urge locking lever 410 to its lockable position. Further, although locking member 50 (with camming surface 60, 61 and locking recess 55) is illustrated as being fixed to support frame 30, while locking lever 410 is illustrated as straight-sided projection, these two elements could be reversed. Furthermore, the caster assembly could be designed so that the extended portion of the locking member 50 and support arms 221, 222 of swivel wheel mount 200 extend in towards the center of the conveyance.

Figure 6B:
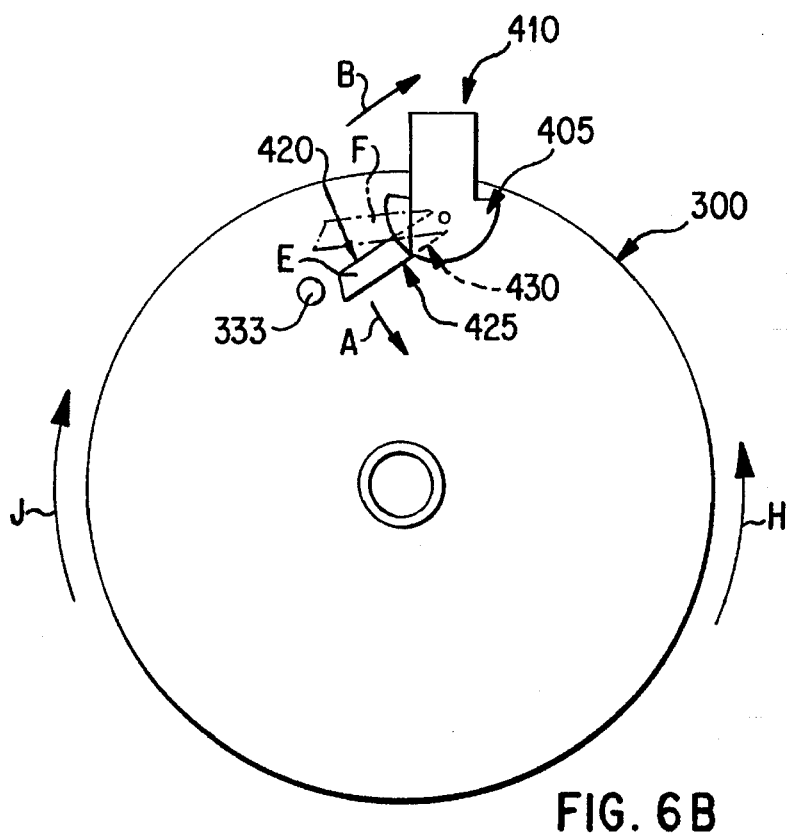

In a second embodiment of this invention, continuous camming surface 330 could be replaced with a single pin 333 (as shown in FIG. 6B). One drawback of this second embodiment is that the pin would only rotate cam follower 420 and swivel lock assembly 405 to the non-lockable position over a relatively small angular displacement of wheel 300. Consequently, wheel 300 may not swivel out of the non-stable locking orientation during this displacement and therefore may not transition to the free swivel state. Wheel 300 may need to rotate nearly a full revolution before gap 355 (in the first embodiment) or pin 333 (in the second embodiment) engages cam follower 420.

Figure 6C:
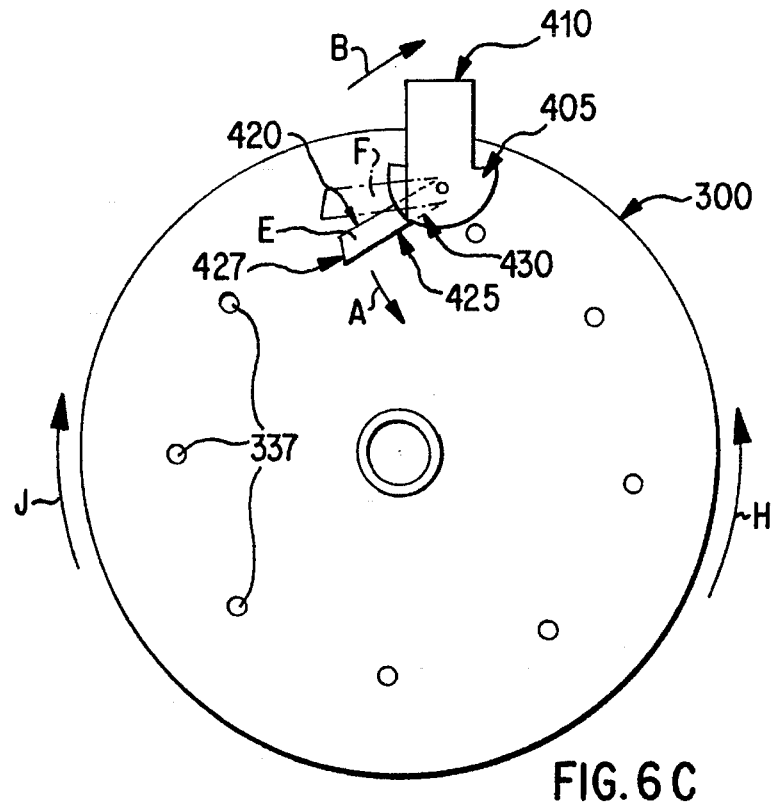

A third embodiment addresses a drawback of the first and second embodiments. Multiple pins 337 (as shown in FIG. 6C) may be used. Pins 337 are appropriately mounted along the inner surface of wheel 300 to engage the cam follower 420. Although this third embodiment reduces the maximum amount of angular displacement of wheel 300 before cam follower 420 engages one of pins 337, it would produce a "clicking" sound that would result from cam follower 420 striking each pin 337.

Figure 6D:
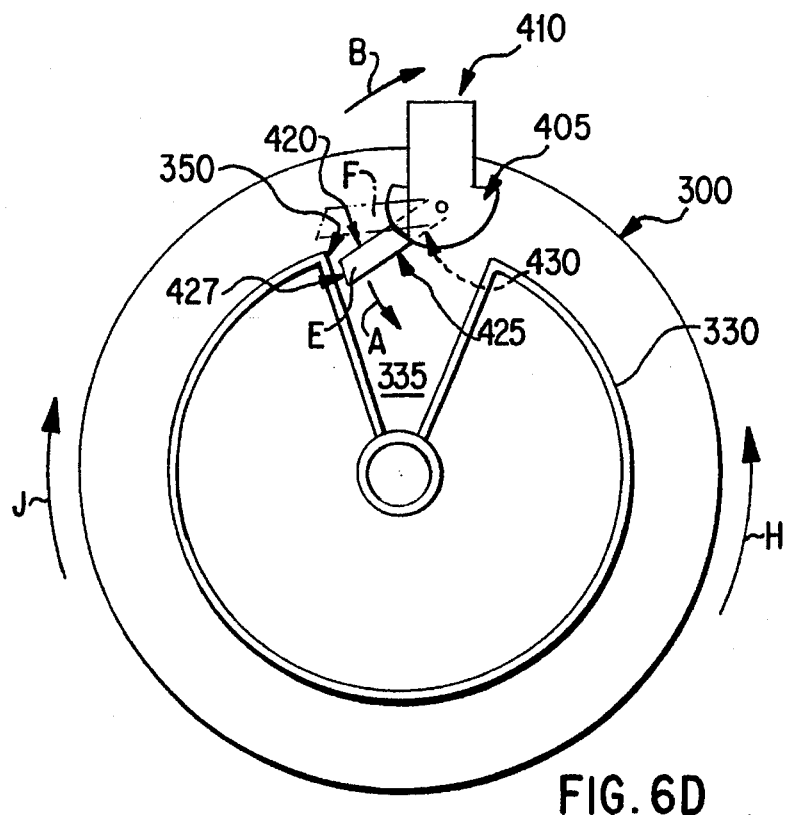

In a fourth and presently preferred embodiment, the distance of the continuous camming surface from the axis of rotation of the wheel could be varied, so that it forms a partial spiral, as shown in FIG. 6D. Edge 340 is spaced from the wheel axis such that cam follower 420 does not engage edge 340, but rather gradually engages the radially outer portion of the camming surface. This eliminates any clicking noise resulting from the cam follower 420 striking edge 340.

What is claimed is:

1. A caster for a wheeled vehicle movable in a forward direction and an opposite, reverse direction, comprising:

a support;

a first lock member coupled to said support;

a wheel mount coupled to said support for rotation about a generally vertical mount axis;

a wheel coupled to said wheel mount for rotation about a generally horizontal wheel axis, said wheel axis being spaced horizontally from said mount axis a fixed distance, said wheel mount having a stable mount position in which said wheel axis is approximately perpendicular to, and behind said mount axis with respect to the direction of motion of the vehicle, motion of the vehicle tending to move said wheel mount about said mount axis to said stable mount position, said wheel rotating in a first wheel direction with respect to said wheel mount in response to motion of the vehicle when said wheel mount is within 90° of said stable mount position and in an opposite, second wheel direction when said wheel mount is more than 90° away from said stable mount position;

a first cam surface disposed on said wheel generally concentrically about said wheel axis;

a second lock member coupled to said wheel mount for movement between a lockable position and a non-lockable position and being biased with respect to said wheel mount toward said lockable position;

a cam follower coupled at a first end thereof to said second lock member, a second end of said cam follower engaging said first cam surface with movement of said wheel, said cam follower being movable by said cam surface through a range of motion including an engagement position, a first displaced position on one side of said engagement position, and a second displaced position on the other side of said engagement position, movement of said cam follower from said engagement position to said second displaced position urging said second lock member to said non-lockable position of said second lock member, said cam follower being biased with respect to said second lock member from said first displaced position toward said engagement position, said first cam surface urging said cam follower to said first displaced position when said wheel rotates in said first wheel direction, and urging said cam follower to said second displaced position when said wheel is rotated in said second wheel direction, said cam surface thereby urging said first lock member to said non-lockable position when said wheel is rotated in said second wheel direction;

said wheel mount being in a lockable orientation when said wheel mount is in said stable position and said vehicle is moving in one of the forward and reverse directions, said second lock member engaging said first lock member to thereby prevent rotation of said wheel mount about said mount axis when said wheel mount is in said lockable orientation and said second lock member is in said lockable position, whereby said wheel mount is fixed in said stable orientation when said vehicle is moving in one of the forward and reverse directions and said wheel mount is freely pivotable about said stable orientation when said vehicle is moving in the other of said forward and reverse directions.

2. The caster of claim 1, wherein one of said first and second lock members includes a locking recess into which the other of said first and second lock members is received.

3. The caster of claim 2, wherein said locking recess is bounded by opposed camming surfaces, when said second lock member is in said unlockable position and said wheel mount is moved into said stable position, one of said opposed camming surfaces engages said second lock member to pivot said second lock member thereby allowing said second lock member to slip into said locking recess.

4. The caster of claim 1, wherein said first cam surface is a continuous surface extending substantially about the perimeter of said wheel.

5. The caster of claim 4, wherein the radial distance of said cam surface from said wheel axis varies along said cam surface.

6. The caster of claim 1, wherein said first camming surface is a pin.

7. The caster of claim 1, further comprising a second wheel coupled to said wheel mount.

8. The caster of claim 1, wherein said cam follower is biased by gravity.

9. The caster of claim 1, wherein said cam follower is biased by a spring.

10. The caster of claim 1, wherein said second locking member is biased by gravity.

11. A caster for a wheeled vehicle as recited in claim 1, wherein said second locking member is biased by a spring.

12. A caster for a wheeled vehicle, comprising:

a support;

a locking member coupled to said support and having an extended portion with a locking slot therein;

a wheel mount rotatably coupled to said support;

a swivel lock assembly pivotally coupled to said wheel mount and having a lockable and non-lockable position and being biased with respect to said wheel mount to said lockable position;

a camming lever pivotally attached to said swivel lock assembly and movable through a range of motion including engagement position, a first displaced position on one side said engagement position, and a second displaced position on the other side of said engagement position urging said lock assembly to said unlockable position, said camming lever being biased to said engagement position with respect to said lock assembly;

a wheel coupled to said wheel mount and rotatable in a first rotational direction and a second rotational direction with respect to said wheel mount;

a first camming surface disposed concentrically on said wheel;

said swivel mount having a lockable orientation with respect to said locking member, said wheel mount being positioned in said lockable orientation so that said lock assembly may engage said locking slot of said locking member;

said caster assembly being in a swivel locked state when said lock assembly is at least partially disposed within said locking slot;

said first camming surface displacing said camming lever to said second displaced position to pivot said swivel lock assembly to said non-lockable position when said caster assembly is in said swivel locked state and when the rotational direction of said wheel changes from said first rotational direction to said second rotational direction, thereby releasing said swivel lock assembly from said locking slot and allowing swivel;

said swivel lock assembly engaging said locking slot of said locking member when said swivel lock assembly is in said lockable position and said wheel swivels to said lockable orientation and said wheel is rotating in said first rotational direction, thereby preventing said caster wheel from swiveling.

\* \* \* \* \*